United States Patent [19]

Wilkinson

[11] 4,034,269
[45] July 5, 1977

[54] PROTECTIVE RELAY CIRCUITS

[75] Inventor: Stanley B. Wilkinson, Havertown, Pa.

[73] Assignee: General Electric Company, Philadelphia, Pa.

[22] Filed: Dec. 12, 1975

[21] Appl. No.: 640,308

[52] U.S. Cl. ................. 361/79; 361/86; 361/89; 361/187; 361/85
[51] Int. Cl.² ......................... H02H 7/00
[58] Field of Search ............ 317/77 R, 31, 33 R, 317/36 D, 36 E, 36 TD, 38

[56] References Cited

UNITED STATES PATENTS

| | | | |
|---|---|---|---|
| 2,775,725 | 12/1956 | Ellis | 317/36 D |
| 3,539,865 | 11/1970 | Billings | 317/38 X |
| 3,944,890 | 3/1976 | Little | 317/36 TD |
| 3,956,670 | 5/1976 | Shimp et al. | 317/36 TD |

Primary Examiner—Harry E. Moose, Jr.
Attorney, Agent, or Firm—William Freedman

[57] ABSTRACT

A protective relay circuit. An electrical system signal quantity is monitored and applied to a filter and to a bipolar threshold device in parallel with the filter. The bipolar threshold device has a zero output signal level as long as the magnitude of the monitored signal is less than some predetermined value. When the monitored signal exceeds the predetermined value, the output of the bipolar threshold device will be substantially equal to the monitored signal level minus the predetermined value. The output of the filter and the output of the bipolar threshold device are combined in a summing amplifier to provide a signal for controlling the trip coil of a circuit breaker. When the circuit is used in an overcurrent or overvoltage protective relay, the combined signal is rectified and applied to a level detector which provides the signal for controlling the trip coil of the circuit breaker. When the circuit is used in a distance or directional relay, the phase of the combined signal as compared to the phase of a second monitored signal determines the generation of the signal for controlling the trip coil of the circuit breaker.

49 Claims, 7 Drawing Figures

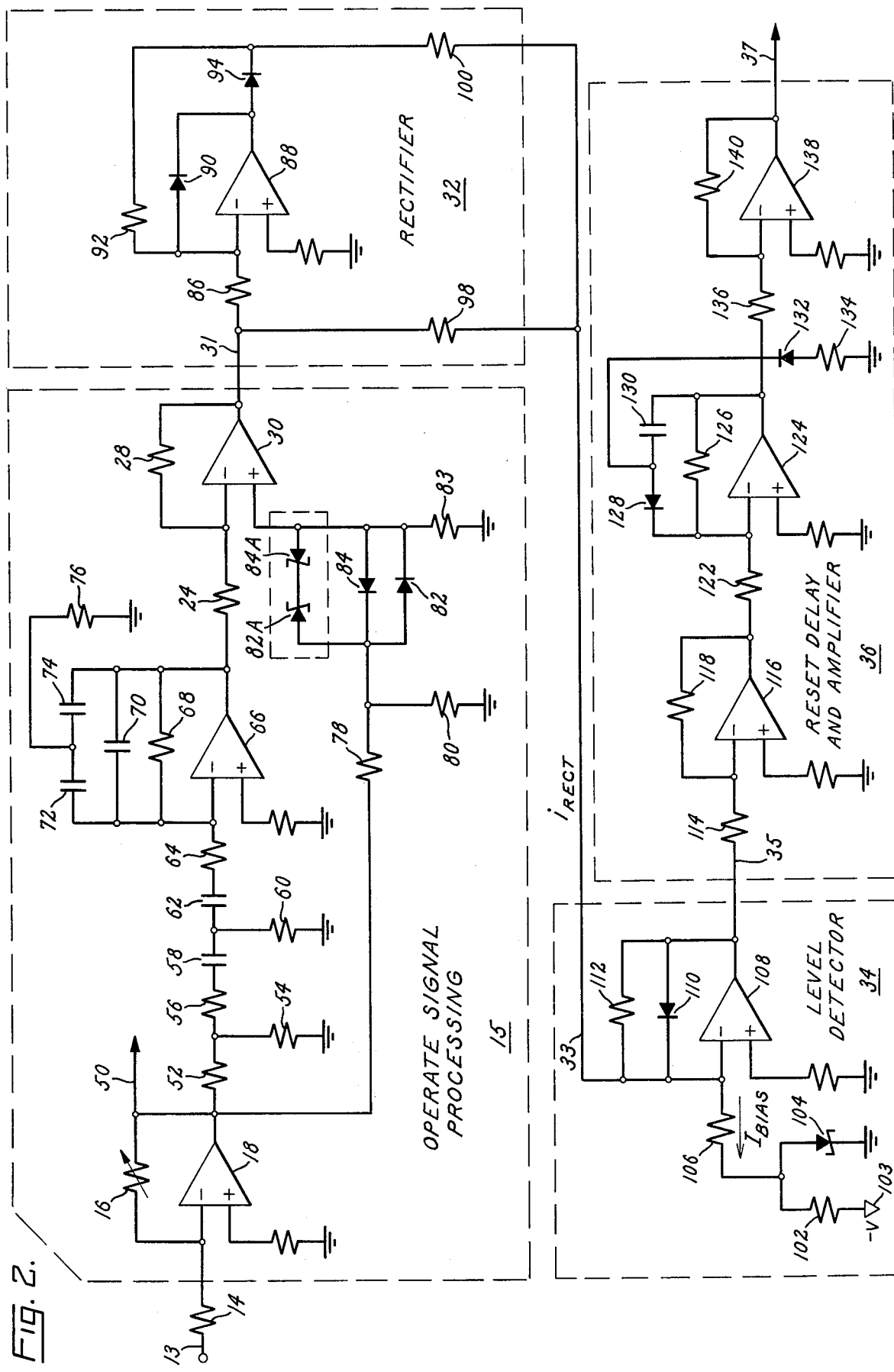

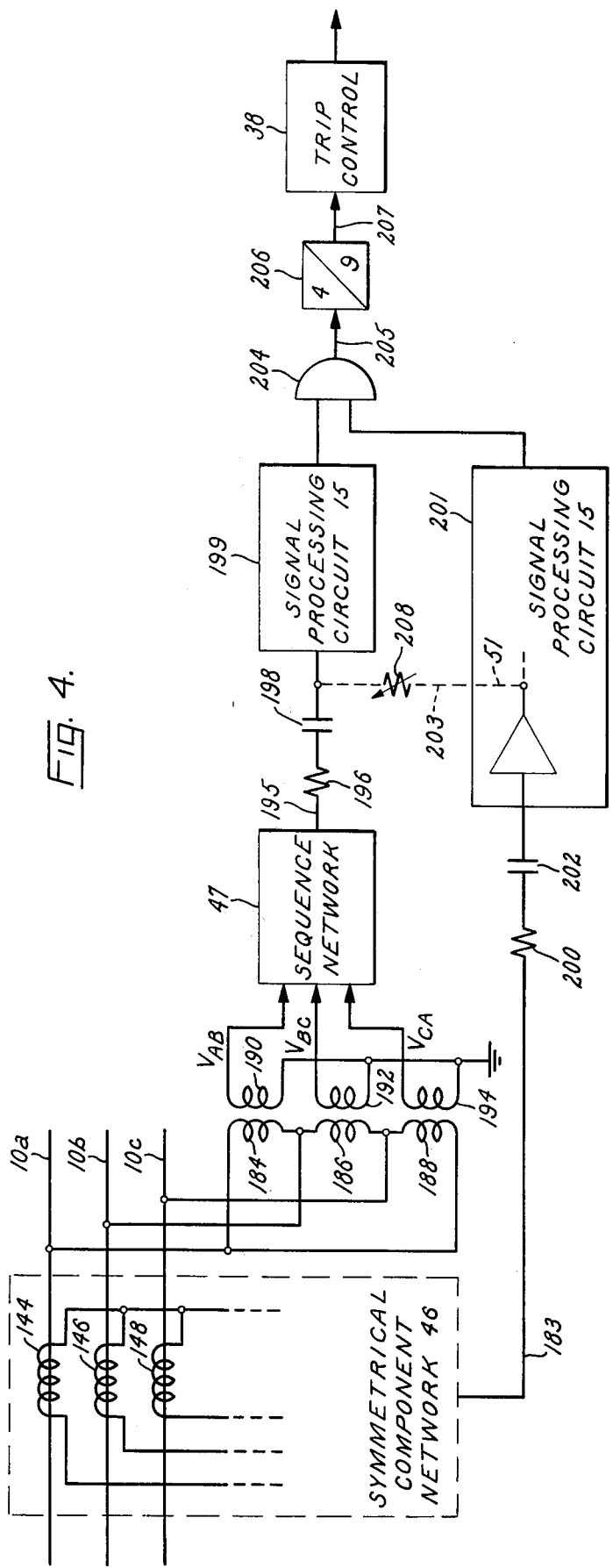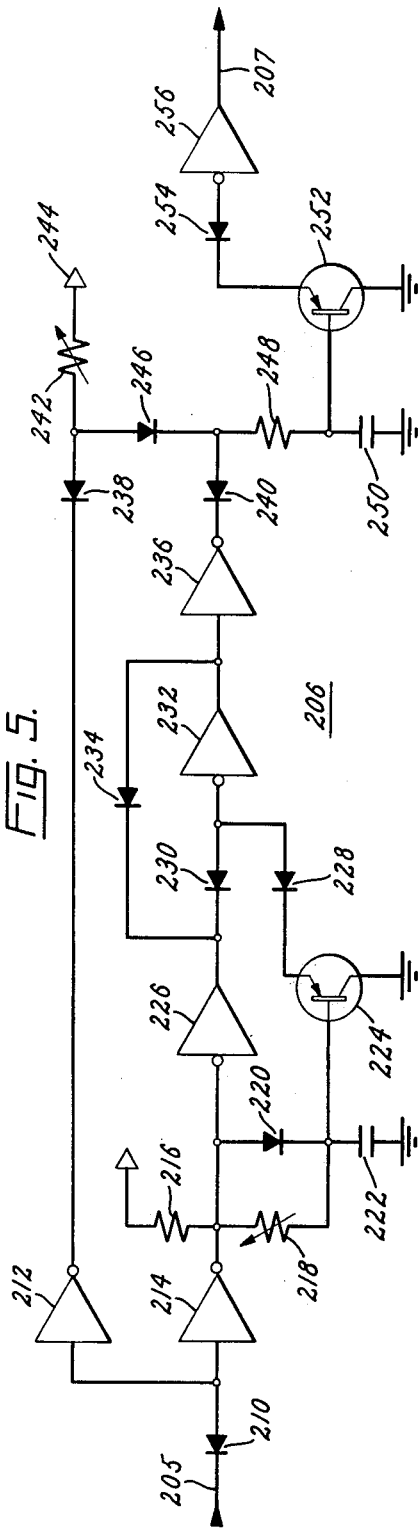

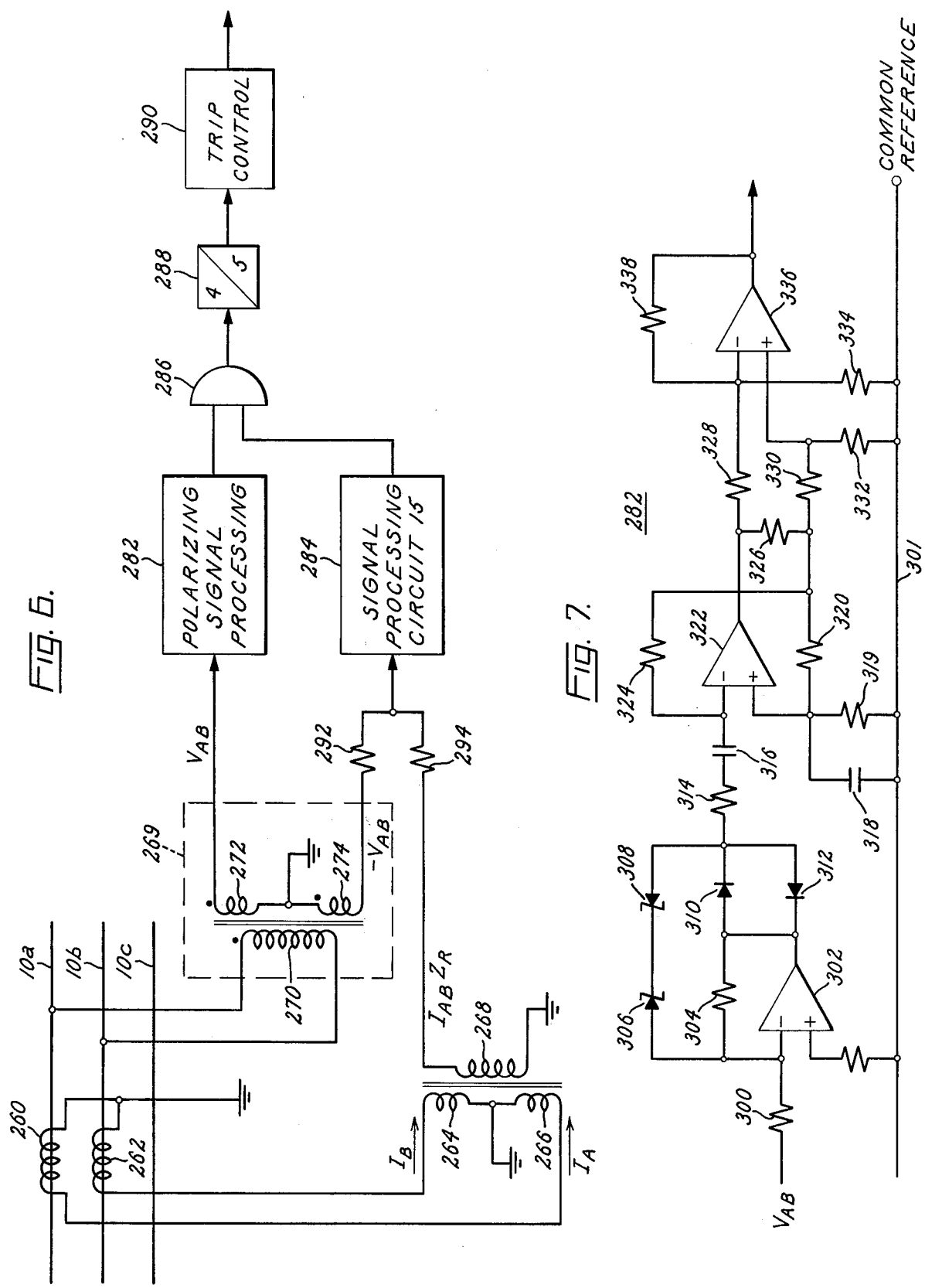

PROTECTIVE RELAY CIRCUITS

BACKGROUND OF THE INVENTION

This invention relates to protective relay circuits and in particular to a circuit for processing electric power system signals in order to detect a fault condition and then to generate a signal for operating the trip coil of a circuit breaker. It is well known in the relay art that protective relays have a tendency to pick up for faults farther away than expected if the offsets due to transients in the fault signals arriving at the relay terminals are not eliminated. This tendency is known in the relay art as "overreach". For a discussion of overreach see The Art and Science of Protective Relaying, Mason, published by John Wiley & Sons, Inc. (1956), pages 82–83, 308–310, and 350–352. Transients in the power system also occur during the normal operation of the electrical power system, for example, when load is being picked up or dropped. Since the above-discussed transients can result in the erroneous detection of a fault condition, it is common in protective relays to filter the measured electrical power system signals in order to remove the transient components therefrom. The filter provides increased security by preventing false tripping of the circuit breaker during certain transient conditions at the expense of an increased time in detecting a fault condition. Since the filter is designed to provide the desired system security for the lowest level of fault signals, there is excessive delay in detecting certain high level fault signals. One prior art solution for reducing the delay in detecting high level fault conditions involves establishing a first threshold level for the measured fault parameter above which the trip coil of the circuit breaker will be instantaneously activated. In this prior art solution there is still excessive delay in detecting intermediate level fault signals less than the first predetermined threshold level. It would be desirable to establish a second threshold level for the fault signal further dividing the fault signal into a low range of levels and an intermediate range of levels and to speed up the generation of the signal for operating the circuit breaker for intermediate levels of the fault signal.

It is, therefore, one object of my invention to provide a protective relay having an improved circuit for generating a signal for controlling the trip coil of a circuit breaker.

It is another object of my invention to provide a protective relay having an improved circuit, including a filter, for monitoring the condition of an electrical system wherein for intermediate fault signal levels, the extent to which the filter determines the delay time to the generation of a tripping coil signal is a highly inverse function of the fault signal level.

Another object of my invention is to provide an improved overcurrent or overvoltage protective relay.

And yet another object of my invention is to provide an improved directional relay.

Another object of my invention is to provide an improved distance relay.

SUMMARY OF THE INVENTION

In the present invention the electrical system signal quantity being monitored is applied to a filter and to a bipolar threshold device in parallel with the filter. The bipolar threshold device has a zero output signal level as long as the magnitude of the monitored signal is less than some predetermined value. When the monitored signal exceeds the predetermined value, the output of the bipolar threshold device will be substantially equal to the monitored signal level minus the predetermined value. The output of the filter and the output of the bipolar threshold device are combined in a summing amplifier to provide a signal for controlling the trip coil of a circuit breaker. When the circuit of my invention is used in an overcurrent or overvoltage protective relay, the combined signal is rectified and applied to a level detector which provides the signal for controlling the trip coil of the circuit breaker. When the circuit of my invention is used in a distance or directional relay, the phase of the combined signal as compared to the phase of a second monitored signal determines the generation of the signal for controlling the trip coil of the circuit breaker.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

FIG. 2 is a schematic diagram of the overcurrent relay depicted in FIG. 1.

FIG. 4 is a block diagram of a directional relay using the circuit of my invention.

FIG. 5 is a schematic of a timer shown as a block in FIGS. 4 and 6.

FIG. 6 is a block diagram of a distance relay using the circuit of my invention.

FIG. 7 is a schematic diagram of the circuit for processing the polarizing signal shown as a block in FIG. 7.

DETAILED DESCRIPTION

For the sake of convenience, certain elements described with reference to a specific figure will retain the same reference designation in the description of subsequent figures.

Figure 1:
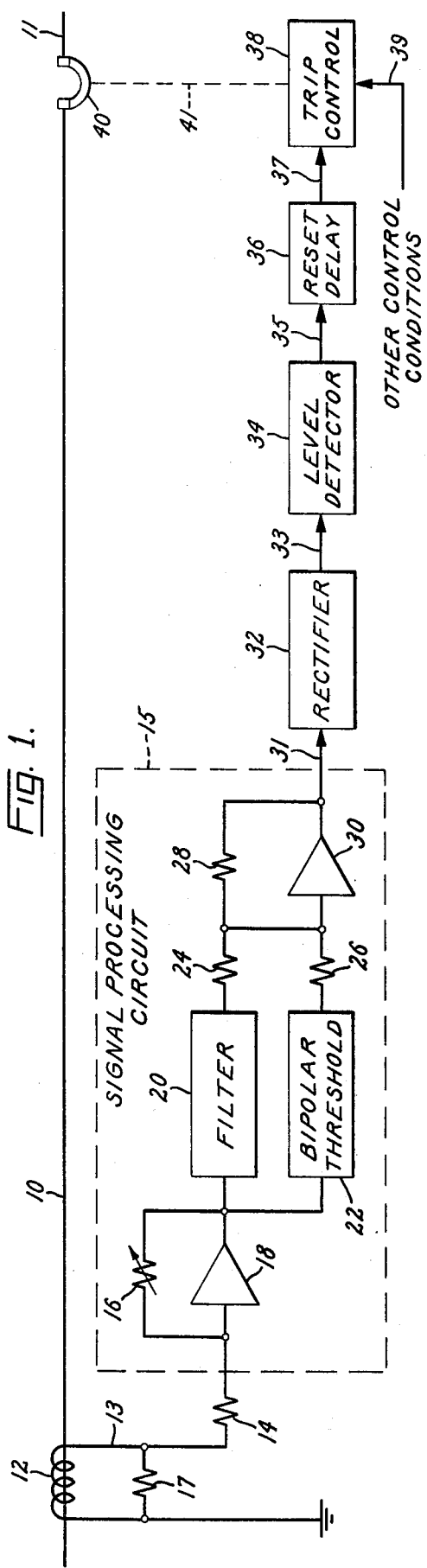
FIG. 1 is a block diagram of an overcurrent relay which uses the circuit of my invention.

FIG. 1 is a block diagram of an overcurrent relay using the trip coil control circuit of my invention. As shown in the Figure, electric power is being conducted from power conductor 10 to power conductor 11 through circuit breaker contacts 40. Current transformer 12, paralleled by burden resistor 17, is coupled to power conductor 10 and provides a voltage signal on conductor 13 that is proportional to the current flowing through the power conductor 10. The signal generated by current transformer 12 is applied to operational amplifier 18 of signal processing circuit 15 through input resistor 14. The gain of operational amplifier 18 is established by adjusting variable feedback resistor 16. The amplified current signal is applied to a filter 20 which reduces the effect of any transients in the amplified current signal. The amplified current signal from operational amplifier 18 is also applied to a bipolar threshold circuit 22 which has a zero output level when the instantaneous magnitude of the amplified current signal is less than some predetermined threshold value and has an output equal to the amplified current level minus the predetermined threshold value when the magnitude of the amplified current signal instantaneously exceeds the predetermined threshold value. The output of filter 20 and the output of the bipolar threshold circuit 22 are applied to operational amplifier 30 through summing input resistors 24 and 26, respectively. The gain of operational amplifier 30 is established by selecting the value of feedback resistor 28. The processed current signal which appears at conductor 31 is applied to a rectifier 32, which provides at the rectifier output 33, an undulating, unipolar voltage. The output of rectifier 32 is applied to a level detector 34 which will have an active output level when the instantaneous amplitude of the rectified signal exceeds some predetermined value and will have an inactive output level when the output of the rectifier 32 has an amplitude less than the predetermined value. The output of the level detector 34 which appears on connductor 35 is applied to a trip control circuit 38 through a reset delay circuit 36. Since the level detector 34 is operating in response to a rectified, sinusoidal signal at conductor 33, the level detector output will alternate between the active and inactive state during a fault condition. It is desirable during the fault condition to have a continuous trip control signal. Therefore, the reset delay circuit 36 delays the inactivation of the trip control signal at conductor 37 for a period long enough to ride through the inactive gaps of the level detector output signal that occur during the fault condition. The trip control circuit 38 controls the operation of trip contacts 40 as indicated by dashed line 41. In some relay applications the circuit breaker contacts 40 will be opened solely on the basis of the current level in the power conductor 10, while in other applications the control of circuit breaker contacts 40 will be determined by the level of current in the power conductor 10 and other system conditions as applied to the trip control circuit 38 on conductor 39.

The response of the relay of FIG. 1 to different levels of fault current in the power conductor 10 will now be described. Under normal load conditions the output of filter 20 will be a signal proportional to the normal load current flowing in power conductor 10. The output signal level of filter 20 during normal load conditions is generally small compared to the filter output signal level in response to fault currents flowing in the power conductor 10. Under normal load conditions and during low level fault currents, the output of operational amplifier 18 is less than the predetermined value that will activate bipolar threshold circuit 22 so that the output of the bipolar threshold circuit 22 is a zero signal level and the output of operational amplifier 30, which controls circuit breaker 40, is determined solely by the characteristic of filter 20. For intermediate level fault currents, the amplified fault current signal from operational amplifier 18 exceeds the predetermined value that will activate the bipolar threshold circuit 22, and the output of operational amplifier 30 is determined by the sum of the bipolar threshold output signal which is not delayed from the time of fault initiation, and the filter 20 output signal, which is delayed. As the bipolar threshold output signal increases, the filter 20 output needs only to reach a corresponding fraction of its steady state output in order for the combined signal level of operational amplifier 30 to reach the predetermined level that will activate the output of level detector 34. For large fault current levels, the sum of the bipolar threshold circuit output signal and the filter output signal initially representing normal load current levels will activate the output of level detector 34. In this case the time to activate the level detector 34 is substantially independent of the filter characteristic. Thus, the overcurrent relay of FIG. 1 has three different response characteristics depending upon the fault current level. For low fault current and load current levels less than the predetermined value established by the bipolar threshold circuit 22, the filter 20 determines the tripping characteristic of the circuit breaker. For intermediate values of fault current level established by the bipolar threshold value and the level detector 34 setting, the tripping characteristic is delayed but still operates faster than if determined solely by the filter 20. Finally, when the fault current signal level exceeds a second predetermined value established by the bipolar threshold level value and the level detector setting, the trip control circuit 38 is activated substantially instantaneously.

FIG. 2 is a schematic diagram of a preferred embodiment of the overcurrent relay shown in block diagram form in FIG. 1. The current transformer 12 signal on conductor 13 is applied to the inverting input of operational amplifier 18 through input resistor 14. In accordance with the normal design practice the non-inverting input of operational amplifier 18 as well as of the other operational amplifiers used in this circuit is connected to a common potential through an appropriately selected resistor. A variable feedback resistor 16, connected between the output of operational amplifier 18 and the inverting input of operational amplifier 18, establishes the gain through the operational amplifier 18. The output of operational amplifier 18 is shown as being available on a conductor 50 for use by other relay signal processing circuits. The amplified current signal output of operational amplifier 18 is applied to a voltage divider circuit consisting of resistor 52 and resistor 54. The divided current signal is then applied to the inverting input of operational amplifier 66 through a passive filter circuit consisting of resistors 56, 60, and 64 and capacitors 58 and 62. An active filter circuit, consisting of resistors 68 and 76 and capacitors 70, 72, and 74, connected in the feedback path of operational amplifier 66 provides further rejection of undesirable signal components. The output of operational amplifier 66 is applied to the inverting input of operational amplifier 30 through input resistor 24. Feedback resistor 28, connected between the inverting input and the output of operational amplifier 30, establishes the gain of that amplifier. The amplified current signal generated by operational amplifier 18 is also applied to a bipolar threshold circuit consisting of resistors 78 and 80 and diodes 82 and 84. Resistors 78 and 80 comprise a second voltage divider network. The divided current signal is applied to the non-inverting input of operational amplifier 30 through a pair of back-to-back, parallel-connected diodes 82 and 84. The non-inverting input of operational amplifier 30 is also connected to a common potential through resistor 83.

It should be pointed out that in the description of FIG. 1 the output of the filter 20 was summed with the output of the bipolar threshold circuit 22 in operational amplifier 30. It will be appreciated by those skilled in the circuit design art that in FIG. 2, the output of operational amplifier 30 is related to the instantaneous sum of the bipolar threshold current signal and the filtered current signal. The current signal undergoes a 180° phase shift through operational amplifier 66, and undergoes another 180° phase shift through operational amplifier 30. Since there is no phase shift of the bipolar threshold current signal, the output of operational amplifier 30 is related to the desired sum of the signals. It should also be pointed out that the gain of operational amplifier 30 is determined by the ratio of the feedback resistor 28 to the input resistor 24, and that the gain of operational amplifier 30 to the signal at the inverting input will be G while the gain of the operational amplifier 30 to the signal applied at the non-inverting input will be G+ 1.

The combined signal generated by operational amplifier 30 is applied to the inverting input of operational amplifier 88 through input resistor 86. A diode 90, poled as shown, is connected between the inverting input and the output of operational amplifier 88. Connected in parallel with diode 90 is the series combination of resistor 92 and diode 94. Positive half cycles of a sinewave applied to input resistor 86 tend to make the output of operational amplifier 88 go negative, which causes diode 90 to become conductive thereby clamping the output of operational amplifier 88 near ground potential. Negative half cycles of a sinewave applied to input resistor 86 tend to make the output of operational amplifier 88 go positive, which back biases diode 90 and forward biases diode 94 so that the gain of operational amplifier is established by resistor 92.

The output of operational amplifier 30 is applied to summing resistor 98, and the output of operational amplifier 88, taken at the junction of resistor 92 and diode 94, is applied to summing resistor 100. If the gain of operational amplifier 88 is equal to 1, and the ratio of the value of summing resistor 98 to the value of summing resistor 100 is 2, the sum of the current from operational amplifier 88 and the current in resistor 98 from operational amplifier 30 is a full wave rectified signal having equal half cycle amplitudes of positive current flow in conductor 33 as represented by $i_{RECT}$ in FIG. 2.

A zener diode 104, having its cathode connected to common, and its anode connected to a negative d-c voltage 103 through resistor 102, supplies a predetermined negative bias current, $i_{BIAS}$, to the inverting input of operational amplifier 108 through input resistor 106. A diode 110, poled as shown, in parallel with resistor 112, is connected between the output of operational amplifier 108 and the inverting input of operational amplifier 108. As long as the positive rectified current signal in conductor 33 is instantaneously less than the negative bias current in resistor 106 the output of operational amplifier 108 will tend to be driven positive. When the output of operational amplifier 108 goes positive, diode 110 will become forward conducting thereby clamping the output of operational amplifier 108 to ground. When the amplitude of the positive rectified current signal exceeds the negative bias current through resistor 106, the output of operational amplifier 108 will become negative indicating a fault condition. When the output of operational amplifier 108 is negative, diode 110 is reverse biased and the gain of the operational amplifier will be established by feedback resistor 112.

The output of operational amplifier 108 is applied to an inverting operational amplifier 116 through an input resistor 114. A resistor 118 is connected between the output of operational amplifier 116 and the inverting input of operational amplifier 116. The positive voltage signal out of operational amplifier 116, indicative of a fault condition, is applied to the inverting input of operational amplifier 124 through an input resistor 122. A resistor 126 is connected between the output of operational amplifier 124 and the inverting input of operational amplifier 124. Connected in parallel with resistor 126 is the series combination of diode 128, poled as shown, and capacitor 130. The junction of capacitor 130 and diode 128 is connected to common through a diode 132, poled as shown, and a resistor 134. As the output of operational amplifier 116 goes from ground to a positive voltage level, indicating a fault current condition, current will be supplied to the inverting input of operational amplifier 124 through input resistor 122 which will tend to drive the output of operational amplifier 124 negative. Under these conditions, diode 128 will be reverse biased and diode 132 will become forward biased, and since the value of resistor 134 is small, capacitor 130 will quickly charge to the negative output voltage as commanded by the input. When the output of operational amplifier 116 goes from a positive value towards ground the output of operational amplifier 124 will be maintained at a negative level by the charge stored on capacitor 130. Under these conditions diode 132 will be back biased and diode 128 will be forward biased and capacitor 130 will discharge through diode 128 and resistor 126. When capacitor 130 is fully discharged the output of operational amplifier 124 will then be ground. Capacitor 130 thus acts to delay the resetting of the fault current condition signal at the output of amplifier 124. The output of operational amplifier 124 is applied to the inverting input of operational amplifier 138 through an input resistor 136. A resistor 140 is connected between the output of operational amplifier 138 and the inverting input of operational amplifier 138. Operational amplifier 138 inverts and squares the fault current condition signal generated by operational amplifier 124. The output of operational amplifier 138 which appears at conductor 37 is the trip control signal that is applied to the trip control block 38 shown in FIG. 1.

The bipolar threshold circuit 22 of the described embodiment consisted of resistors 78, 80 and 83, and diodes 82 and 84. It will be apparent to those skilled in the art that if it is desired that the bipolar threshold circuit 22 have a zero response for a greater range of current levels, such a result can be obtained by replacing the diodes 82 and 84 by a pair of back-to-back series connected zener diodes, 82A and 84A. It is clear that the voltage divider resistors 78 and 80 also can be employed to increase the range of current levels for which zero response is obtained. It will also be clear to those skilled in the art that the output of current amplifier 18 can be connected directly to the diodes 82 and 84 and that, in yet another embodiment, the attenuated amplified current signal appearing at the junction of resistor 78 and 80 could be directly applied to the non-inverting input of amplifier 30.

It will also be recognized by those skilled in the art that the circuits of FIG. 1 and FIG. 2 could be used as an overvoltage relay if a potential transformer coupled to the voltage being monitored supplies the signal at conductor 13, the input of the circuit of FIG. 2.

Further, it is clear that an undervoltage relay function is obtained if the output signal on conductor 37 is properly interpreted.

Figure 3:
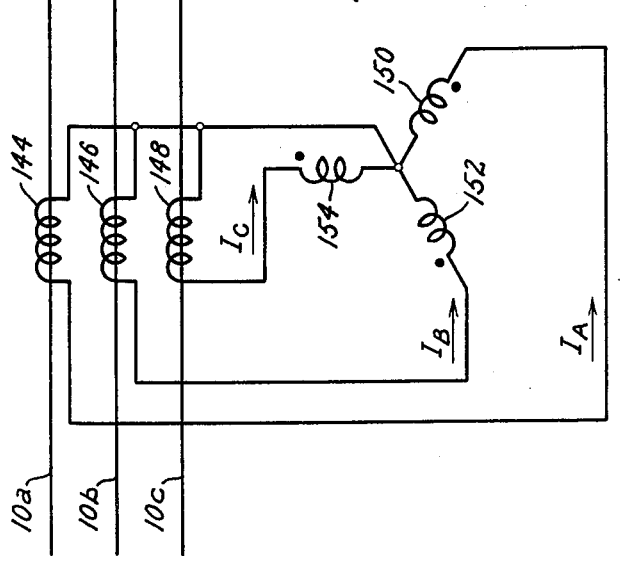
FIG. 3 is a schematic diagram of a circuit for providing a signal that is proportional to a symmetrical component of the electrical system as an input to the relay of FIGS. 1 and 2.

It is well understood by those skilled in the art of electric power transmission and distribution that the phase currents in a three phase alternating current electric circuit can be resolved into three sets of symmetrical, balanced current vectors known respectively as positive sequence, negative sequence, and zero sequence components. The negative and zero sequence components of circuit current are not present under balanced circuit conditions. It is also well known that certain circuits called "symmetrical component networks" can be connected to a three phase electric power system to provide an output signal that is proportional to the magnitude of a selected one of the three sequence components of current. The relay depicted in FIGS. 1 and 2 can operate on the magnitude of a selected symmetrical component of current when the input to resistor 14 is driven by the symmetrical component network 46 shown in FIG. 3 which consists of measurement transformers and a sequence network 47. As shown in FIG. 3, the portion of the three phase electric power system being monitored is represented by lines 10a, 10b, and 10c. Current transformers 144, 146, and 148, coupled respectively to lines 10a, 10b, and 10c, provide a measurement of the three line currents. The secondary windings of current transformers 144, 146, and 148 are respectively connected in parallel with wye-connected primary windings 150, 152, and 154 of an auxiliary wye-delta current transformer. Corresponding ends of each of the isolated delta windings 156, 158, and 160 are connected to a common reference 161. Burden resistors 162, 164, and 166 are connected in parallel with windings 160, 158, and 156 respectively to develop thereacross the voltage signals proportional to $I_{CA}$, $I_{AB}$ and $I_{BC}$. The voltage $I_{CA}$ is applied to junction 163 through resistor 168 having a value 6R. The voltage $I_{BC}$ is applied to junction 163 through resistor 170 having a value 3R. A capacitor 176 having a value 3R is connected between junction 163 and common 161. The signal at junction 163 is applied to the summing input of operational amplifier 178 through resistor 174 having a value 2R. The signal $I_{AB}$ is applied to the summing input of operational amplifier 178 through resistor 172 having a value 8R. Resistor 180 having a value GR and connected between the input and output of operational amplifier 178 determines the gain of the symmetrical component network. When the elements of the symmetrical component network have the assigned ratios, the signal appearing at the output of operational amplifier 178 will be proportional to the negative sequence component of current flowing in conductors 10a, 10b and 10c. A more detailed description of symmetrical component networks as illustrated in FIG. 3 is given in application Ser. No. 564,015, filed Apr. 1, 1975, by M. E. Hodges and assigned to the assignee of this invention. It is clear that the relay of FIG. 1 could also monitor a symmetrical component of power system voltage.

FIG. 4 is a block diagram of a directional relay using the signal processing circuit 15 described in FIGS. 1 and 2. In FIG. 4 the portion of the three phase power system being monitored is represented by conductors 10a, 10b, and 10c. A symmetrical component network 46, similar to that illustrated in FIG. 3, is coupled to power conductors 10a, 10b, and 10c to provide, on conductor 183, a signal proportional to the negative sequence component of current in the power system. The negative sequence component current signal is applied to the input of a signal processing circuit 201, similar to that illustrated in FIGS. 1 and 2, through a phase shift network consisting of resistor 200 in series with capacitor 202. Potential transformer windings 184, 186, and 188 are connected to power conductors 10a, 10b, and 10c to provide across secondary windings 190, 192, and 194, signals proportional to the phase voltages $V_{AB}$, $V_{BC}$, and $V_{CA}$ respectively. The voltages developed across secondary windings 190, 192, and 194 are applied to a sequence network 47, similar to that illustrated in FIG. 3, to provide at the conductor 195 a signal proportioal to the negative sequence component of voltage in conductors 10a, 10b, and 10c. This negative sequence component of voltage is applied to a second signal processing circuit 199 similar to that illustrated in FIGS. 1 and 2. It should be pointed out that since the directional relay is not concerned with the amplitude of the signals generated by processing circuits 199 and 201, but rather is concerned with the phase of the signals generated by processing circuits 199 and 201, the gain of each operational amplifier 30 of processing circuits 199 and 201 can be increased so as to provide a square wave signal to the inputs of coincidence AND circuit 204. The output of AND circuit 204 is applied to a timer 206 which provides a control signal for trip control circuit 38. Timer 206 is shown as being a 4–9 timer which means that the timer will tend to activate trip control circuit 38 if the positive output of signal processing circuit 199 coincides with the positive output of signal processing circuit 201 continuously for four milliseconds; or if the corresponding negative outputs coincide for four milliseconds; and if one such coincidence occurs, an output signal on conductor 207 will be maintained for 9 milliseconds.

Although the signal processing circuits 199 and 201 of the directional relay of FIG. 4 operated on the negative sequence current and the negative voltage it will be clear to those skilled in the art that the signal processing circuits 199 and 201 could have processed a phase voltage and a line current. For a discussion of the various types of directional relays in which a signal processing circuit as described in FIGS. 1 and 2 can be utilized, see pages 49–69 of the previously mentioned textbook by Mason.

In an alternate embodiment of the relay of FIG. 4, the negative sequence voltage signal can be combined, for example, by summing, with the negative sequence current signal appearing at conductor 51, of signal processing circuit 201 to provide the input signal to signal processing circuit 199.

FIG. 5 is a schematic diagram of a timer shown as a block in FIG. 4. A logic one level from coindidence AND gate 204 of FIG. 4, applied to conductor 205, will tend to activate the timer 206. The timer input signal is applied to inverter elements 212 and 214 through a diode 210. The output of inverter 214 controls the charging and the discharging of a timing capacitor 222. When the output of inverter 214 is a high logic level, capacitor 222 will be charged very quickly through the low forward impedance of diode 220 and resistor 216 which has a low value. When the output of inverter 214 is a low logic level, diode 220 will be reverse biased and capacitor 222 will discharge slowly through variable resistor 218. The output of inverting amplifier 214 is also applied to the input of inverter 226 and the output of inverter 226 is applied to the cathode of diode 230. The voltage on capacitor 222 is applied to the cathode of diode 228 through transistor 224. Diodes 228 and 230 act as an AND gate input for inverter 232. The output of inverter 232 drives inverter 236 which drives control diode 240. Diode 234 connected between the output of inverter 226 and the output of inverter 232 causes a logic zero level at the input of inverter 236 if either the output of inverter 232 is at a low logic level, or the output of inverter 226 is at a low logic level. The output of inverter 212 is applied to the cathode of control diode 238. The logic levels at the cathodes of diodes 238 and 240 control the charging and discharging of capacitor 250 which controls the reset delay for timer 206. When high levels are present at the cathode of diodes 238 and 240, both diodes will be back biased and capacitor 250 will be slowly charged from voltage source 244 through variable resistor 242, diode 246, and resistor 248. A low logic level applied to the cathode of diode 240, irrespective of the logic level appearing at the cathode of diode 238, results in the rapid discharge of capacitor 250 through the small resistance 248, diode 240, and the output circuit of inverter 236. If a low logic level is applied to the cathode of diode 238 while a high logic level appears at the cathode of diode 240, the junction of variable resistor 242 and the anode of diode 246 will be clamped to the low logic level thereby back biasing diode 246 which prevents any further charging of capacitor 250. The voltage appearing on capacitor 250 is applied to the input of inverter 256 through a transistor 252 and a diode 254. The output of inverter 256 which appears on conductor 207 is the output of the timer circuit.

The general operation of the timer will now be discussed. Let us start out by assuming that capacitor 250 is charged to a relatively high voltage level so that the output of inverter 256 is at a low logic level. If the output of coincidence AND gate 204 is a high logic level, the output of inverter 214 will be a low logic level and capacitor 222 will slowly discharge through variable resistor 218. However, during the initial discharge period of capacitor 222, a high logic level is being applied to the cathode of diode 228, and since the output of inverter 226 is a high logic level, the output of inverter 232 will be a low logic level and the output of inverter 236 will be a high logic level which maintains the output of inverter 256 at the low logic level. If the input at conductor 205 remains at the high logic level for four milliseconds, capacitor 222 will be discharged to the point where the input to inverter 232 via diode 228 will reach the low logic level state, the output of inverter 232 will become a high logic level and the output of inverter 236 will become a low logic level which results in the instantaneous discharge of capacitor 250 which causes the output of inverter 256 to go to the high logic level. It should be noted that if the signal applied to conductor 205 remains a high logic level for less than four milliseconds, the low logic level causes a high logic level at the output of inverter 214 which causes capacitor 222 to rapidly charge up to the high voltage level through the forward resistance of diode 220 thereby restarting the 4 millisecond coincidence timing function. Let us now assume that the output of inverter 256 is a high logic level due to a four millisecond coincidence signal being applied to the conductor 205. Inverter 226 will go to the low logic level state which will, through diode 234, cause the input of inverter 236 to go to the low-logic level thereby driving the output of inverter 236 to a high logic level. If the input signal at conductor 205 returns to the low logic level, the output of inverter 226 will be a low logic level which, through diode 234, applies a low logic level to the input of inverter 236 which results in a high logic level being applied to diode 240. With a low logic level applied at conductor 205 the output of inverter 212 will be a high logic level which is applied to diode 238. When high logic levels are applied to diodes 238 and 240, voltage source 244 is allowed to charge capacitor 250 through variable resistor 242. When the voltage across capacitor 250 reaches the switching point of inverter 256, the output of inverter 256 will go to the logic level. If the signal applied to conductor 205 should return to the high logic level state before the voltage across capacitor 250 reaches the switching point for inverter 256, the resulting low logic level at inverter 212 is applied to the junction of variable resistor 242 and diode 246 causing diode 246 to be back biased which prevents further charging of capacitor 250. Thus, the signal at conductor 205 must accumulate 9 milliseconds, in the low logic level state as determined by adjusting resistor 242 before the output of inverter 256 will switch from the high logic level state to the low logic level state.

FIG. 6 is a block diagram of a conventional distance relay employing the signal processing circuit illustrated in FIGS. 1 and 2. The portion of the three phase power system being monitored is represented by power conductors 10a, 10b, and 10c. Current transformers 260 and 262, respectively coupled to power conductor 10a and 10b, are respectively connected in parallel with primary windings 264 and 266 of a transactor. The signal appearing at the output of the secondary winding 268 of the transactor is a voltage proportional to the phase current $I_{AB}$ times a replica impedance $Z_R$ which represents the impedance of the power transmission line, from the relay location to the fault location beyond which operation of the distance relay unit should not operate. This distance along the transmission line corresponding to the replica impedance is generally referred to as the "reach" of the relay.

Transformer means 269 as represented by the winding 270 coupled to power conductors 10a and 10b, and secondary windings 272 and 274, provides across secondary winding 272 a voltage proportional to $+V_{AB}$, and provides across winding 274 a voltage proportional to minus $V_{AB}$. The signal $+V_{AB}$, the polarizing signal of the distance relay, is applied to a polarizing signal processing circuit 282, having an output that is applied to one input of coincidence AND circuit 286. The minus $V_{AB}$ signal is applied to a summing resistor 292 and the $1_{AB}Z_R$ signal is applied to summing resistor 294 to provide at the junction of resistors 292 and 294 a signal proportional to IZ − V. The IZ − V signal is applied to a signal processing circuit 284 similar to that described in FIGS. 1 and 2. The output of signal processing circuit 284 is applied to the second input of coincidence AND circuit 286. The output of AND circuit 286 is applied to the input of a timer circuit 288 which, in a preferred embodiment, is a 4 − 5 timer. The output of timer 288 provides a control signal for trip control circuit 290. The timer 288 is similar to that illustrated in FIG. 5.

A preferred embodiment of the polarizing signal processing circuit is illustrated in FIG. 7. The polarizing signal $+V_{AB}$ is applied to the inverting input of operational amplifier 302 through input resistor 300. Resistor 304 connected between the output of operational amplifier 302 and the inverting input establishes the gain of the amplifier. The amplified polarizing signal is applied to a bipolar threshold circuit, as discussed in the description of FIGS. 1 and 2, consisting of diodes 310 and 312 connected in parallel and back-to-back. Back-to-back, series connected zener diodes 306 and 308 limit the amplitude of the signal that is applied to operational amplifier 322. The limited, amplified polarizing signal is applied to the inverting input of operational amplifier 322 though the series combination of resistor 314 and capacitor 316. The parallel combination of resistor 319 and capacitor 318 is connected between the non-inverting input of operational amplifier 322 and common reference 301. The inverting input of operational amplifier 322 is also connected to the non-inverting input of operational amplifier 322 through the series combination of resistors 324 and 320. Operational amplifier 322 and its associated circuitry provides filtering and short term memory of the amplified polarizing signal. The output of operational amplifier 322 is connected to the junction of resistor 320 and 324 through resistor 326 and is connected to the inverting input of operational amplifier 336 through input resistor 328. The signal appearing at the junction of resistors 320 and 324 is applied to the non-inverting input of operational amplifier 336 through resistor 330. Resistors 332 and 334 connect the non-inverting input and the inverting input respectively of operational amplifier 336 to the common reference 301. Resistor 338 connected between the output and inverting inputs of operational amplifier 336 establishes the gain of operational amplifier 336. Operational amplifier 336 and its associated circuitry provides for control of the phase and also squares the object of the signal applied to the coincidence AND circuit 286.

What has been described is a circuit for processing a power system fault signal in order to generate a control signal for the tripping coil of a circuit breaker. Also described are overcurrent, overvoltage, directional and distance relays embodying the signal processing circuit.

While the present invention has been described with reference to a specific embodiment thereof it will be obvious to those skilled in the art that various changes and modifications may be made without departing from the invention in its broader aspects. It is contemplated in the appended claims to cover all variations and modifications of the invention which come within the true spirit and scope of my invention.

What is claimed as new and desired to be secured by Letters Patent of the U.S. is:

1. A circuit for generating a signal for controlling the trip coil of a circuit breaker protecting an a-c power system comprising:
 a. a sensor adapted to be coupled to one a-c power line for generating a sensor signal proportional to an electrical quantity in the power system that is subject to variations;
 b. a filter responsive to the sensor signal for filtering the transient component from the sensor signal;
 c. first circuit means responsive to the sensor signal for generating a signal having a first output level when the sensor signal is less than a predetermined level and having a second output level when the sensor signal exceeds said predetermined level, said second output level being a function of the sensor signal level;
 d. second circuit means for combining the first generated signal and the filtered signal; and
 e. third circuit means responsive to the combined signal for generating said trip coil control signal when the combined signal exceeds a fixed level.

2. A circuit as recited in claim 1 wherein the sensor generates a signal proportional to the voltage of said power system.

3. A circuit as recited in claim 1 wherein the first circuit means first output level is zero and the second output level is the sensor level minus said predetermined level.

4. A circuit as recited in claim 1 wherein the first circuit means comprises an attenuator.

5. A circuit as recited in claim 1 wherein the first circuit means comprises a pair of parallel-connected, back-to-back diodes.

6. A circuit as recited in claim 1 wherein the first circuit means comprises a pair of series-connected, back-to-back, zener diodes.

7. A circuit as recited in claim 1 wherein the filtered signal is in phase with the first generated signal and wherein the second circuit means is a summing amplifier.

8. A circuit as recited in claim 1 wherein the filtered signal is 180° out of phase with the first generated signal and wherein the second circuit means is an operational amplifier having an inverting input and a non-inverting input, said filtered signal being applied to one of said operational amplifier inputs and the first generated signal being applied to the other operational amplifier input.

9. A circuit as recited in claim 1 additionally comprising:
 a. fourth circuit means responsive to the third circuit means signal for delaying inactivation of the trip coil control signal for a predetermined time interval.

10. A circuit as recited in claim 9 additionally comprising
 a. a circuit for rectifying the combined signal, said third circuit means being responsive to the rectified signal.

11. A circuit as recited in claim 5 wherein the first circuit means additionally comprises a pair of back-to-back diodes connected between the attenuator and the second circuit means.

12. A circuit as recited in claim 11 wherein the filtered signal is 180° out of the phase with the first generated signal and wherein the second circuit means is an operational amplifier having an inverting input and a non-inverting input, said filtered signal applied to one of said operational amplifier inputs and the first generated signal being applied to the other operational amplifier input.

13. A circuit as recited in claim 12 additionally comprising:
 a. fourth circuit means responsive to the third circuit means signal for delaying inactivation of the trip coil control signal for a predetermined time interval.

14. A circuit as recited in claim 13 additionally comprising:
 a. a circuit for rectifying the combined signal, said third circuit means being responsive to the rectified signal.

15. A circuit for generating a signal for controlling the trip coil of a circuit breaker protecting an a-c power system comprising:
 a. a symmetrical component network adapted to be coupled to the a-c power system for generating a sensor signal proportional to a symmetrical component of a quantity in the power system that is subject to variations;
b. a filter responsive to the sensor signal for filtering the transient component from the sensor signal;
c. first circuit means responsive to the magnitude of said symmetrical component for generating a signal having a first output level when the symmetrical component magnitude is less than a predetermined level and having a second output level when the symmetrical component magnitude exceeds said predetermined level, said second output level being a function of the sensor signal level;
d. second circuit means for combining the first generated signal and the filtered signal; and
e. third circuit means responsive to the combined signal for generating said trip coil control signal when the combined signal exceeds a fixed level.

16. A circuit as recited in claim 15 wherein the symmetrical component network generates a sensor signal proportional to a symmetrical component of voltage in the power system.

17. A circuit for generating a signal for controlling the trip coil of a circuit breaker protecting an a-c power system comprising:
a. first circuit means adapted to be coupled to the power system for generating a signal related to power system current by a predetermined constant impedance;
b. second circuit means adapted to be coupled to the power system for generating a signal related to the power system voltage;
c. third circuit means for vectorially combining the first and second generated signals;
d. a filter responsive to the third circuit combined signal for filtering the transient from the combined signal and for providing some memory of the prior steady state signal level;
e. fourth circuit means responsive to the third circuit means combined signal for generating a signal having a first output level when the combined signal is less than a predetermined level and having a second output level when the cominbed signal exceeds said predetermined level said second output level being a function of the combined signal level;
f. fifth circuit means for combining the filtered signal with the fourth circuit means signal; and
g. sixth circuit means responsive to the fifth circuit means combined signal and to a polarizing signal for generating the trip coil control signal when a predetermined relationship exists between the fifth circuit means combined signal and the polarizing signal.

18. A circuit as recited in claim 17 wherein the polarizing voltage is proportional to said power system voltage.

19. A circuit as recited in claim 17 wherein the fourth circuit means first output level is zero and the second output level is the third circuit combined level minus said predetermined level.

20. A circuit as recited in claim 17 wherein the fourth circuit means comprises an attenuator.

21. A circuit as recited in claim 17 wherein the fourth circuit means comprises a pair of parallel-connected, back-to-back diodes.

22. A circuit as recited in claim 17 wherein the fourth circuit means comprises a pair of series-connected back-to-back zener diodes.

23. A circuit as recited in claim 18 further comprising an additional filter responsive to the polarizing voltage for providing some memory of the prior steady state polarizing signal level.

24. A circuit as recited in claim 17 wherein the filtered combined signal is in phase with the fourth circuit means signal and wherein the fifth circuit means is a summing amplifier.

25. A circuit as recited in claim 17 wherein the filtered combined signal is 180 degrees out of phase with the fourth circuit means signal and wherein the fifth circuit means is an operational amplifier having an inverting and a non-inverting input, said filtered combined signal being applied to one of said operational amplifier inputs and the fourth circuit means signal being applied to the other operational amplifier input.

26. A circuit as recited in claim 17 wherein the sixth circuit means comprises:
a. AND circuit means responsive to the fifth circuit combined signal and to the polarizing signal for generating an output related to the phase of the fifth circuit combined signal with respect to the polarizing signal; and
b. timer means responsive to the AND circuit output signal for generating the trip coil control signal when said phase exceeds a predetermined value.

27. A circuit as recited in claim 18 wherein the fourth circuit means first output level is zero and the second output level is the third circuit combined level minus said predetermined level.

28. A circuit as recited in claim 27 wherein the fourth circuit means comprises a pair of parallel-connected, back-to-back diodes.

29. A circuit as recited in claim 28 further comprising an additional filter responsive to the polarizing voltage for providing some memory of the prior steady state polarizing signal level.

30. A circuit as recited in claim 29 wherein the filtered combined signal is 180° out of phase with the fourth circuit means signal and wherein the fifth circuit means is an operational amplifier having an inverting and a non-inverting input, said filtered combined signal being applied to one of said operational amplifier inputs and the fourth circuit means signal being applied to the other operational amplifier input.

31. A circuit as recited in claim 30 wherein the sixth circuit means comprises:
a. AND circuit means responsive to the fifth circuit combined signal and to the polarizing signal for generating output related to the phase of the fifth circuit combined signal with respect to the polarizing signal; and
b. timer means responsive to the AND circuit output signal for generating the trip coil control signal when said output exceeds a predetermined value.

32. A circuit for generating a signal for controlling the trip coil of a circuit breaker protecting an a-c power system comprising:
a. first circuit means adapted to be coupled to the power system for generating a signal proportional to the power system voltage;
b. second circuit means adapted to be coupled to the power system for generating a signal proportional to the power system current;
c. a first filter responsive to the first circuit means signal for filtering the transient component from the first circuit signal;

d. third circuit means responsive to the first circuit mean signal for generating a signal having a first output level when the first circuit means signal is less than a predetermined level and having a second output level when the first circuit means signal exceeds said predetermined level, said second output level being a function of the first circuit means signal level;
e. fourth circuit means for combining the third circuit means signal with the signal of the first filter;
f. a second filter responsive to the second circuit means signal for filtering the transient component from the second circuit signal;
g. fifth circuit means responsive to the second circuit means signal for generating a signal having a first output level when the second circuit means signal is less than a predetermined level and having a second output level when the second circuit means signal exceeds said predetermined level, said second output level being a function of the second circuit means signal level;
h. sixth circuit means for combining the fifth circuit means signal with the signal of the second filter; and
i. seventh circuit means responsive to the fourth and sixth circuit means signals for generating the trip coil control signal when a predetermined relationship exists between the fourth circuit means signal and the sixth circuit means signal.

33. A circuit as recited in claim 32 wherein the first circuit means signal is proportional to a symmetrical component of the power system voltage and wherein the second circuit means signal is proportional to a symmetrical component of the power system current.

34. A trip coil control circuit as recited in claim 32 wherein the second circuit means additionally comprises circuit means for generating a second signal proportional to the power system current and wherein the said trip coil control circuit additionally comprising eighth circuit means responsive to the first circuit means signal and the second signal proportional to the power system current for vectorially combining the first circuit means signal and the second power system current signal, said first filter and third circuit means being responsive to the eighth circuit means signal.

35. A circuit as recited in claim 32 wherein the third circuit means first output level is zero and the second output level is the first circuit means signal level minus said predetermined level and wherein the fifth circuit means first level is zero and the second output level is the second circuit means signal level minus said predetermined level.

36. A circuit as recited in claim 32 wherein the third circuit means and the fifth circuit means each comprises an attenuator.

37. A circuit as recited in claim 32 wherein the third circuit means and the fifth circuit means each comprise a pair of parallel-connected, back-to-back diodes.

38. A circuit as recited in claim 32 wherein the third circuit means and the fifth circuit means each comprise a pair of series-connected, back-to-back zener diodes.

39. A circuit as recited in claim 32 wherein the first signal is in phase with the third circuit means signal, wherein the second filter signal is in phase with the fifth circuit means signal and wherein the fourth and sixth circuit means are summing amplifiers.

40. A circuit as recited in claim 32 wherein the first filter signal is out of phase with the third circuit means signal, wherein the second filter signal is 180° out of phase with the fifth circuit means signal, and wherein the fourth and sixth circuit means are operational amplifiers each having an inverting input and a non-inverting input, said filter signals being applied to one of said inputs of respective operational amplifiers and the third and fifth circuit means signals being applied to the other inputs of respective operational amplifiers.

41. A circuit as recited in claim 32 wherein the seventh circuit means comprises;
a. AND circuit means responsive to the fourth and sixth circuit means signals for generating an output related to the phase of the fourth circuit signal with respect to the sixth circuit means signal; and
b. timer means responsive to the AND circuit output signal for generating the trip coil control signal when said output exceeds a predetermined value.

42. A circuit as recited in claim 35 wherein the third circuit means and the fifth circuit means each comprise a pair of parallel-connected, back-to-back diodes.

43. A circuit as recited in claim 42 wherein the first filter signal is out of phase with the third circuit means signal, wherein the second filter signal is 180° out of phase with the fifth circuit means signal, and wherein the fourth and sixth circuit means are operational amplifiers each having an inverting input and a non-inverting input, said filter signals being applied to one of said inputs of respective operational amplifiers and the third and fifth circuit means signals being applied to the other inputs of respective operational amplifiers.

44. A circuit as recited in claim 43 wherein the seventh circuit means comprises;
a. AND circuit means responsive to the fourth and sixth circuit means signals for generating an output related to the phase of the fourth circuit signal with respect to the sixth circuit means signal; and
b. timer means responsive to the AND circuit output signal for generating the trip coil control signal when said output exceeds a predetermined value.

45. A circuit as recited in claim 44 wherein the first circuit means signal is proportional to a symmetrical component of the power system voltage and wherein the second circuit means signal is proportional to a symmetrical component of the power system current.

46. A trip coil control circuit as recited in claim 44 wherein the second circuit means additionally comprises circuit means for generating a second signal proportional to the power system current and wherein the said trip coil control circuit additionally comprising eighth circuit means responsive to the first circuit means signal and the second signal proportional to the power system current for vectorially combining the first circuit means signal and the second power system current signal, said first filter and third circuit means being responsive to the eighth circuit means signal.

47. A circuit as recited in claim 46 wherein the first circuit means signal is proportional to a symmetrical component of the power system voltage and wherein the second circuit means signal is proportional to a symmetrical component of the power system current.

48. A circuit as recited in claim 1 wherein the sensor generater a signal proportional to the current in the power system.

49. A circuit as recited in claim 15 wherein the symmetrical component network generates a sensor signal proportional to a symmetrical component of current in the power system.

* * * * *